United States Patent [19]
Reed et al.

[11] Patent Number: 5,925,396
[45] Date of Patent: *Jul. 20, 1999

[54] FRIED SNACK PIECES AND PROCESS FOR PREPARING

[75] Inventors: Jada Dawn Reed; Paul Seiden, both of Cincinnati; Stephen Paul Zimmerman, Wyoming, all of Ohio

[73] Assignee: The Procter & Gamble Company, Cincinnati, Ohio

[ * ] Notice: This patent is subject to a terminal disclaimer.

[21] Appl. No.: 08/963,638

[22] Filed: Nov. 3, 1997

Related U.S. Application Data

[63] Continuation of application No. 08/644,767, May 10, 1996, abandoned.

[51] Int. Cl.⁶ .............................. A21D 2/16; A23L 1/217
[52] U.S. Cl. ................ 426/549; 426/439; 426/550; 426/560; 426/637; 426/808
[58] Field of Search .................... 426/438, 439, 426/441, 637, 549, 550, 560, 808

[56] References Cited

U.S. PATENT DOCUMENTS

| | | |
|---|---|---|
| Re. 27,531 | 12/1972 | Murray et al. . |
| 2,962,419 | 11/1960 | Minich . |
| 3,027,258 | 3/1962 | Markakis et al. ................ 426/550 X |
| 3,579,548 | 5/1971 | Whyte . |
| 3,597,227 | 8/1971 | Murray . |
| 3,626,466 | 12/1971 | Liepa . |
| 4,005,195 | 1/1977 | Jandacek . |
| 4,508,746 | 4/1985 | Hamm .................... 426/601 |
| 4,511,583 | 4/1985 | Olson et al. ................ 426/89 |
| 4,560,569 | 12/1985 | Ivers .................... 426/550 X |
| 4,582,927 | 4/1986 | Fulcher .................... 560/201 |
| 4,873,093 | 10/1989 | Fazzocare et al. ................ 426/550 X |
| 4,888,196 | 12/1989 | Ehrman et al. .................... 426/601 |
| 4,970,084 | 11/1990 | Pirrotta et al. .................... 426/550 X |
| 5,085,884 | 2/1992 | Young et al. .................... 426/611 |
| 5,104,678 | 4/1992 | Yang .................... 426/601 |
| 5,171,600 | 12/1992 | Young et al. .................... 426/550 |
| 5,188,859 | 2/1993 | Lodge et al. .................... 426/560 |
| 5,288,512 | 2/1994 | Seiden .................... 426/607 |
| 5,419,925 | 5/1995 | Seiden et al. .................... 426/611 |
| 5,422,131 | 6/1995 | Elsen et al. .................... 426/531 |
| 5,451,416 | 9/1995 | Johnston et al. .................... 426/531 |
| 5,464,643 | 11/1995 | Lodge .................... 426/439 |
| 5,480,667 | 1/1996 | Corrigan et al. .................... 426/531 |
| 5,490,995 | 2/1996 | Corrigan .................... 426/531 |

FOREIGN PATENT DOCUMENTS

WO 95/07610  3/1995  WIPO .

*Primary Examiner*—Arthur L. Corbin
*Attorney, Agent, or Firm*—Karen F. Clark; Daniel F. Nesbitt; Rose Ann Dabek

[57] ABSTRACT

A process for preparing reduced fat shaped snack products having a light, crispy, crunchy texture is disclosed. A dough is formed:

(1) from about 50% to about 70% of a source of starch based flour;

(2) at least about 3% hydrolyzed starch having a DE of from about 5 to about 30;

(3) from about 0.5% to about 6% a fatty acid polyglycerol ester emulsifier having a saponification value of between 80 and about 135, and a hydroxyl value between 300 and 575, wherein the fatty acids of said ester comprises palmitic and stearic acid and wherein the polyglycerol ester is at least 40% monoester;

(4) from about 20% to about 40% added water, and (5) from about 1% to about 6% polyol fatty acid polyester.

This dough is formed into sheets from which snack pieces are cut. The snack pieces are fried to provide a snack having 20% to 38% nondigestible fat and less than 0.5 gm/30 gm serving of digestible fat.

20 Claims, No Drawings

FRIED SNACK PIECES AND PROCESS FOR PREPARING

This is a continuation of application Ser. No. 08/644,767, filed May 10, 1996, now abandoned.

TECHNICAL FIELD

This application relates to an improved fried snack product which is lower in fat than other fried snacks made from doughs and fried in nondigestible fats. In particular, this application relates to a process for preparing such products from a dough containing hydrolyzed starches, e.g. maltodextrizin or corn syrup solids (D. E. of 5 to 30) and relatively low levels of water, and a polyglycerol ester emulsifier dissolved in a polyol fatty acid polyester.

BACKGROUND OF THE INVENTION

A wide variety of starch and protein-based snack food products are presently available to the consumer. Many of these products are in the form of chips, strips, and extruded tubular pieces. Some of these products are expanded or puffed and contain a cellular or honeycombed internal structure. In addition, most of the present-day snack products contain a fairly high level of fat, either in the form of separately added ingredients, such as cheese, or in the form of fats imparted to the product during cooking, as in the case of corn or potato chips. Fat improves the flavor and palatability of these products. However, it also increases the caloric value of the product. Even chips and snacks fried in non-digestible fats such as olestra, contain some fat in the form of emulsifiers or oils or fats naturally present in the grains used to make the product.

Accordingly, it would be desirable to provide reduced fat snack products which have an attractive appearance, texture and taste and which contain less than 0.5 gm of fat per 30 gram servings. Such products are essentially fat free.

There have been several attempts at lowering the fat content of potato chips and of potato snacks made from doughs. One method involved coating chips with an aqueous dispersion of a high amylose starch. This is said to produce a potato chip with minimal oil pick-up and low variation in the amount of oil absorbed. (see RE 27,531 of U.S. Pat. No. 3,597,227 issued to Muray, et al., 1971). Coating of breaded or batter food products with a film forming agent such as gelatin or starches is also said to lower oil absorption by the foods when they are fried (U.S. Pat. No. 4,511,583 issued to Olson, et at, 1985). U.S. Pat. No. 5,085,884 issued to Young et al, describes reduced caloric potato chips which are made with nondigestible fats, in particular with polyol fatty acid polyesters. U.S. Pat. No. 5,464,643 (issued to Lodge, 1995) describes the use of hydrolyzed starches as part of the dough to provide snacks with a lower fat content. However, when making fabricated snacks, i.e., those made from doughs, other considerations arise. For example, the dough has to be sheeted or extruded. Emulsifiers are a key processing aid in preparing a dough which can be easily extruded or sheeted. Not all emulsifiers will function in the doughs to give both sheetability and good texture to the products.

Moreover, since the solids content, degree of hydrolysis and the water content of the dough also affect the browning and the texture of the product, a way to control these parameters is also needed.

It is therefore an object of this invention to make a fried snack containing a nondigestible oil which is lower in digestible fat content (between about 0.1 to about 0.5 gm/30 gram serving) and which has the same lubricity and texture as a snack with a higher fat content.

It is a further object of this invention to make a fried fabricated snacks which produce a uniform product in a controlled process.

DISCLOSURE OF THE INVENTION

The present invention relates to an improved reduced fat fried snack product and a process for it.

This process comprises the steps of:
(a) forming a sheetable dough comprising:
  (1) from about 50% to about 70% of a source of starch based flour;
  (2) at least about 3% hydrolyzed starches having a DE of from about 5 to about 30;
  (3) from about 0.5% to about 6% of a fatty acid polyglycerol ester emulsifier having a saponification value of between 80 and about 135, a hydroxyl value between 300 and 575, and wherein said fatty acids comprise mostly palmitic and stearic acid and wherein the ratio of palmitic to stearic acid is from about 2:1 to about 5:1, and wherein the polyglycerol ester is at least 40% monoester;
  (4) from about 20% to about 40% added water; and
  (5) from about 1% to about 5% polyol fatty acid polyester;
(b) forming the dough into a sheet,
(c) cutting snack pieces from the sheet; and
(d) frying said snack pieces in a nondigestible fat.

Tie snack pieces are fried at a temperature sufficient to form snack products having a light, crispy, crunchy texture, improved flavor and a nondigestible fat content of from about 20% to about 38% and between about 0.1 to about 0.50 gm of fat per 30 gram serving contributed by the emulsifier.

A particularly important aspect of the process of the present invention is the inclusion of the polyol polyester in the dough with the polyglycerol emulsifier. The polyol polyester contributes to the sheetability of the dough and the improved dough handling characteristics. The formulation provides for lower water level doughs which lead to fried snack products that contain less fat than corresponding doughs made with higher water levels. In addition, the inclusion of hydrolyzed starches in the product improves the flavor of the snack. It is believed that adding reducing sugars with the hydrolyzed starches enhances flavor formation during frying.

All percentages and proportions are "by weight" unless otherwise specified.

A. Dough Formation

A particularly important aspect of the process of the present invention is the dough. This dough is formed from a combination of starch based flour, water, hydrolyzed starches, a polyglycerol emulsifier, a polyol fatty acid polyester, as well as other optional ingredients to be described hereinafter. The composition of this dough has two significant effects. One relates to the ability to process the dough into a sheet from which snack pieces of predetermined shape and size are subsequently formed. The dough pieces are then fried to form thin, crisp, shaped snack products. The other effect of the dough composition relates to the textural and flavor features of the resulting fried snack product. Snack products prepared according to the process of the present invention have a relatively light, crunchy texture.

As used herein, the term "crunchy texture" refers to a snack that exhibits a crisp and crunching sensation for the first of several chews.

An important component of this dough is a starch based flour. The dough comprises, by weight, from about 50% to about 70%, preferably from about 55% to about 65%, starch based flour. Potato flour is the most preferred source of starch based flour. Suitable sources of potato flour include, dehydrated potato flakes and granules, mashed potato materials, and dried potato products. Other tuber and grain flours such as tapioca, peanut, wheat, oat, rice, corn meal, corn flour and soy meal can be used in the dough. These starch based flours can be blended to make snacks of different composition and flavor. Suitable starches can be used in combination with the potato flour. Examples of such materials are potato starch, tapioca starch, cornstarch, oat starch, rice starch and wheat starch. Most preferably these starches are cooked so the starch has gelatinized and then are dried and milled to make a flour. These starches are called pregelatinized starches. For example, potato flour is at least 90% pregelatinized starch. Preferred flours contain at least 80% pregelatinized starch. Potato flakes generally contain more pregelatinized starch than potato granules. A preferred combination is 80:20 to 95:5 potato flakes to potato granules. It is understood that other sources of pregelatinized starches other than potato flakes and granules can be used.

The Water Absorption Index (WAI) of the carbohydrate component is important for controlling the flake hydration. Preferably the potato flake material which is used as the predominant potato ingredient has a WAI of between 7 and 9 and that of the other starch ingredient has a WAI of between 2 and 6.

As used herein, the term "hydrolyzed starches" refers to oligosaccharide-type materials that are typically obtained by acid or enzymatic hydrolysis of starches, preferably corn starch. Suitable hydrolyzed starches for inclusion in the dough include maltodextrins and corn syrup solids. The hydrolyzed starches for inclusion in the dough have Dextrose Equivalent (I. E.) values of from about 5 to about 30, preferably from about 10 to about 20. Maltrin™ MO050, M100, M150, M180, M200, and M250 (available from Grain Processing Corporation, Iowa) are preferred maltodextrins. The D. E. value is a measure of the reducing equivalence of the hydrolyzed starch referenced to dextrose and expressed as a percent (on a dry basis). The higher the D. E. value, the more reducing sugars are present.

Hydrolyzed starches are included in the dough in an amount of at least about 3%, with a usual range of from about 3% to about 15%. Preferably, hydrolyzed starches are included in an amount of from about 5% to about 12%.

Hydrolyzed starches are a key ingredient for the processability of the doughs of the present invention which have relatively low water levels. In the absence of hydrolyzed starches, low moisture levels in the dough can prevent formation of a continuous, smooth extensible dough sheet and can hinder subsequent expansion of the dough pieces during frying, even if the dough can be sheeted. It also affects the elasticity of the dough. In addition, low moisture doughs tend to produce a harder and more brittle texture in the resulting snack products.

As previously alluded to, another important characteristic of the dough of the present invention is its water content. As used herein, the term "added" refers to water which has been added to the dry dough ingredients. Water which is inherently present in the dry dough ingredients, such as in the case of the sources of flour and starches, is not included in the added water. The level of water in flours and starches is usually from about 3% to about 8%. However, if the maltodextrin or corn syrup solids are added as a solution or syrup, the water in this syrup or solution must be accounted for as "added water".

The doughs of the present invention can comprise from about 20% to about 40% added water. Preferably, these doughs comprise from about 23% to about 35% added water. This low level of water in the dough along with the addition of hydrolyzed starches provides doughs which can form cohesive sheets. In addition, the low moisture level of the doughs of the present invention are important in reducing the oil content of the final fried snack pieces.

Polyglycerol emulsifiers are added to the dough as a blend with the non-digestible fat. Alternatively, the emulsifier can be incorporated into the potato flake. The amount of emulsifier in the dough is from about 0.5% to about 6% by weight, preferably from about 1.0% to about 3%, and most preferably from about 1.5% to about 2.5%. Emulsifiers are used as a sheeting aid to avoid overworked sticky doughs and to reduce puffing and blistering in the fried product. Lower moisture doughs, when fried, typically yield harder snack products. To make products with textures similar to those made from higher moisture doughs, the level of emulsifier is typically reduced.

Preferred polyglycerol emulsifiers are monoesters of polyglycerols, preferably hexapolyglycerols. The average number of glycerol units is not an exact number. It should be understood that a hexapolyglycerol will contain some tri-, tetra-, penta-, hepta- and octapolyglycerol units. The preferred polyglycerol fatty acid monoesters can be characterized by the average hydroxyl value (number of free or unesterified hydroxy groups), the saponification value which measures the number of ester groups the percent monoester, the palmitic to stearic acid ratio, the onset of crystallization temperature, and the complete melting point.

The polyglycerol esters can be defined as having a complete melt point of between about 121° F. (49° C.) and about 147° F. (64° C.) preferably between about 121° F. (49° C.) (55° C.); an onset of crystallization temperature of between about 1 10° F. (43° C.) and about 120° F. (49° C.); preferably between about 114° F. (46° C.) and about 118° F. (48° C.); a saponification value of between about 80 and about 135, preferably between about 95 and about 135; a hydroxy value of between about 300 and about 575; preferably between about 400 and about 475; and a palmitic to stearic acid ratio of between 2:1 and 5:1. The percent monoester is at least 40% and preferably between 45% and 55%.

In addition to the stearic and palmitic fatty acids, unsaturated fatty acids having from 14 to 20 carbon atoms can be present as can saturated fatty acids having 16 to 22 carbon atoms. The fatty acid ester group is mostly a mixture of stearic and palmitic acids (about 75% or more).

Other emulsifiers can be added to the dough in conjunction with the polyglycerol esters. Then include mono- and diglycerides, diacetyl tartaric acid esters and propylene glycol mono- and diesters.

The emulsifier is added to the dough system prior to sheeting as a processing aid to prevent sticking of the dough to the sheeting mill rolls and to impart extensibility to the sheet to prevent the sheet from tearing. The emulsifier is dissolved in a polyol fatty acid polyester, preferably a sucrose fatty acid ester such as olestra. The emulsifier comprises from about 10% to about 50% of the fat composition which is added. Preferably the composition contains from 20% to about 30% emulsifier and from about 70% to 80% sucrose fatty acid polyester. The sucrose polyester is an important part of the emulsifier fat composition that is used in the dough. The dough comprises, by weight, from about 1% to about 6%, preferably from about 1% to about 5%, more preferably from about 1% to about 4%, polyol fatty acid polyester.

Salt, flavorings, flavor potentiators, and/or seasonings can also be optionally included in the dough or sprinkled on the surface of the snack after frying. It has been found that the addition of sucrose and salt at levels of about 0.5 to about 1.5% of the dough will improve the dough rheology and finished snack texture as well as the flavor.

The dough of the present invention can be prepared by any suitable method for combining the previously described ingredients. Typically, a loose, dry dough is prepared by thoroughly mixing together the flours and/ or starches and emulsifier and sucrose polyester combination. A water preblend of flavoring (optional), hydrolyzed starches, sucrose and/or salt are separately mixed to obtain the previously defined hydrolyzed starch and water levels. The water preblend is then added to the flour and emulsifier blend. Preferred devices for mixing together these dough ingredients are conventional mixers. Hobart™. mixers are used for batch operations and Turbolizer™ mixers can be used for continuous mixing operations. However, extruders can also be used to mix the dough and to form the sheets or shaped pieces.

The emulsifier works via several mechanisms. The first is as a coating of the flour in the mixer just prior to the addition of the water. This limits the moisture absorption of the flour producing a "short" dough. If this order of addition is not followed, the increased starch water bonding is undesirable, generating a well hydrated, highly elastic dough that is difficult to mill into a sheet.

The second function of the emulsifier is to create a dispersion of fat and moisture droplets through the dough. This dispersion serves to lubricate the dough surface and to limit water droplet coalescence that could over hydrate the flour component and cause localized over expansion of the fried product. Both of these mechanism tend to limit the adhesiveness of the starch contained in the flour, preventing permanent adhesion to the sheeting rolls.

The capability of the emulsifier to mix thoroughly with the other ingredients and to readily disperse throughout the dough during mixing and milling are very important. It was found that certain chemical and physical properties correlate to the successful use of emulsifiers and anti-sticking, sheeting and processing aids. These properties are defined above. The use of the sucrose polyester with the emulsifier is important in developing this dispersion of the emulsifier throughout the dough.

B. Sheeting, Snack Piece Formation and Frying

Once prepared, the dough is then formed into a relatively flat, thin sheet. Any method suitable for forming such sheets from starch based doughs can be used. For example, the sheet can be rolled out between two counter rotating cylindrical rollers to obtain a uniform, relatively thin sheet of dough material. Any conventional sheeting, milling and gauging equipment can be used. It has been found however, that the mill rolls should be heated to about 90° F. (32° C.) to about 135° F. (57° C.) to keep the emulsifier/sucrose polyester blend from congealing on the roll mills. In a preferred embodiment, the mill rolls are kept at two different temperatures, with the front roller being cooler than the back roller.

Doughs of the present invention are usually formed into a sheet having a thickness of from about 0.015 to about 0.10 inches (from about 0.038 to about 0.25 cm), and preferably to a thickness of from about 0.05 to about 0.10 inches (from about 0.013 to about 0.025 cm), and most preferably from about 0.065 in to about 0.08 in (1.65 to 2.03 mm). For rippled chips the most preferred thickness is about 0.75 in or 1.9 mm. The dough sheet is then formed into snack pieces of a predetermined size and shape. These snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in WO 95/07610, Dawes et al., Jan. 25, 1996.

The snack pieces are fried. Preferably the snacks are prepared by a continuous frying method and are constrained during frying. An apparatus as described in U.S. Pat. No. 3,626,466 (Liepa, 1971) can be used. The dough pieces are cut from the sheet, shaped using a movable, apertured mold half to shape the cut dough pieces and then held during subsequent frying by a second apertured mold half. A reservoir containing a frying medium is used. The shaped, constrained pieces are passed through the frying medium until they are fried to a crisp state with a final moisture content of about 0.5% to about 4% water.

Continuous frying or batch frying of the snack pieces in a non-constrained mode is also acceptable. In this method the pieces are immersed in the oil on a moving belt or basket.

If desired, the snack pieces can be fried to moisture contents of 10% or less and then heated with hot air, superheated steam or inert gas to lower the moisture level to 4% or less. This is a combined frying/baking step.

The frying medium comprises nondigestible fats and oils. The terms "fat" and "oil" are used interchangeably unless otherwise specified. The terms "fat" or "oil" also refer 100% non-toxic fatty materials having properties similar to triglycerides. The terms "fat" or "oil" in general include fat-substitutes, which materials may be partially or fully non-digestible.

The term "non-digestible fat" refers to those edible fatty materials that are partially or totally nondigestible, e.g., polyol fatty acid polyesters, such as olestra.

The preferred fat substitute are fatty materials having properties similar to triglycerides such as sucrose polyesters. OLEAN,™ a preferred fat substitute, is made by The Procter and Gamble Company. These preferred nondigestible fat or oil substitute compositions are described in Young; et al., U.S. Pat. No. 5,085,884, issued Feb. 4, 1992, and U.S. Pat. No. 5,422,131, issued Jun. 6, 1995 to Elsen et al.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils have a complete melting point below about 37° C. include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher, U.S. Pat. No. 4,582,927; Issued Apr. 15, 1986); liquid triglycerides of alphabranched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); liquid polydimethyl siloxanes (e.g., Fluid Silicones available from Dow Corning). Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein. However the latter composition may provide more digestible fat.

Other ingredients known in the art may also be added to the edible fats and oils, including antioxidants such as TBHQ, chelating agents such as citric acid, and anti-foaming agents such as dimethylpolysiloxane.

The snack pieces are fried at temperatures between about 300° F. (148° C.) and about 450° F. (232° C.). The exact fry time is controlled by the temperature of the oil and the starting water content. The fry time and temperature is easily determined by one skilled in the art.

The snack products made from this process typically have from about 20% to about 38% nondigestible fat. Preferably, the fried snacks will have from about 23% to about 32% fat content. If a higher fat level is desired in the snack product to further improve the lubricity of the snack, oil can be sprayed onto the snack product when it emerges from the fryer, or when it is removed from the mold used in constrained frying. These include low calorie and nonabsorbable fats such as sucrose polyesters. Preferably the oils for spraying will have an iodine value greater than 75, and most preferably above 90. Oils with characteristic flavors or highly unsaturated oils can be sprayed on the snack product. Oils with added flavors can be used. These include butter flavored oils, natural or artificial flavored oils, herb oils and oils with garlic or onion flavors added. This is a way to introduce a variety of flavors without having the flavor undergo browning reactions during the frying. It also avoids adding the flavor to the dough and having the flavor react with or leach into the oil during the frying process. This method can be used to introduce healthier oils which would ordinarily undergo polymerization or oxidation during the heating necessary to fry the snacks.

Oil spray can be used to increase the oil content from the 20% to 38% fat content as the snack product emerges from the fryer to as high as 44% oil. Thus a snack product having from 30% to 44% can be made using this additional step.

ANALYTICAL METHODS

The hydroxyl value is determined by AOCS (American Oil Chemists Society) Method Cd 13–60 revised in 1989.

The Saponification Value is determined by AOCS method Cd 3–25 revised in 1989.

Complete Melting Point is determined by the Differential Scanning Method described at column 22, lines 6–35 of U.S. Pat. No. 5,085,884 issued to Young et al, Feb. 4, 1992, which method is incorporated herein by reference.

The onset of crystallization temperature is measured by Differential Scanning Calorimetry by cooling a melted sample. The onset of crystallization is the temperature at which the exothermic peak first begins.

"Water Absorbance Index" and "WAI" refers to the measurement of the water holding capacity of any carbohydrate based material as a result of a cooking process. (See for example Anderson, R. A., Conway, H. F., Pfeifer, V. F. and Griffin, Jr., E. L., 1969, *Gelatinization of Corn Grits By Roll- and Extrusion-Cooking*. CEREAL SCIENCE TODAY; 14(1):4). This measurement is typically expressed as the ratio of mass of water held per unit mass of material. The WAI for a sample is determined by the following procedure. The weight to two decimal places of an empty centrifuge tube is determined. Two grams of dry sample (e.g., potato flakes) are placed into the tube. Thirty mililiters of water is added to the tube. The water and sample are stirred vigorously to insure no dry lumps remain. The tube is placed in a 29° C. (85° F.) water bath for 30 min., repeating the stirring procedure at 10 and 20 min. The tube is then centrifuged for 15 min. at 3,000 RPM. The water is then decanted from the tube, leaving a gel behind. The tube and contents are weighed. The WAI is calculated by dividing the weight of the resulting gel by the weight of the dry sample (i.e., [weight of tube and gel]–[weight of tube]+[weight of dry flakes]).

EXAMPLE 1

A mix consisting of approximately 53.10% potato flakes, and 5.90% potato granules is blended with a hexapolyglycerol monoester of palinitic and stearic acids available from Lonza as HGMP and OLEAN, available from Procter & Gamble, Cincinnati, Ohio. The level of the emulsifier in the dough is 0.75% and that of the OLEAN is 2.25%. Water, 32.7%, Maltodextrin having a DE of 18 available from Grain Products Corporation and sucrose (0.4%) and salt (0.4%) are mixed with the flake and emulsifier blend to form a loose, dry dough in a continuous Turbolizer® mixer with a residence time of 15 to 60 seconds.

The dough is sheeted by continuously feeding the dough through a pair of sheeting rolls forming an elastic continuous sheet without pin holes. Sheet thickness is controlled to 0.020 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in OLEAN to dryness (about 12 seconds). The product is held in the molds for about 20 seconds to allow the OLEAN to drain. The resulting product has a crisp, light texture with a nondigestible fat level of about 30% to 32%. The digestible fat level from the emulsifier is less than 0.25 gm/30 gm serving.

What is claimed is:

1. A process comprising the steps of:
   (a) forming a sheetable dough comprising, by weight;
      (1) from about 50% to about 70% of a source of starch based flour;
      (2) at least about 3% hydrolyzed starches having a DE of from about 5 to about 30;
      (3) from about 0.5% to about 6% of a fatty acid polyglycerol ester emulsifier having a saponification value of between about 80 and about 135 and a hydroxyl value of between about 300 and about 575, wherein said fatty acid polyglycerol ester has fatty acid chains comprising palmitic acid and stearic acid, wherein the ratio of palmitic acid to stearic acid is from about 2:1 to about 5:1, and further wherein the polyglycerol ester is at least 40% monoester;
      (4) from about 20% to about 40% added water; and
      (5) from about 1% to about 6% polyol fatty acid polyester wherein said polyol fatty acid polyester comprises at least at least four fatty acid ester groups;
   (b) forming the dough into a sheet;
   (c) cutting snack pieces from the sheet; and
   (d) frying said snack pieces in a nondigestible fat.

2. The process of claim 1 wherein the dough is formed into a sheet having a thickness of from about 0.015 to about 0.035 inches (from about 0.038 cm to about 0.088 cm).

3. The process of claim 2 wherein said hydrolyzed starch is selected from the group of maltodextrin and corn syrup solids.

4. The process of claim 3 wherein said flour is potato flour selected from the group consisting of potato flakes, potato granules and mixtures thereof.

5. The process of claim 4 wherein said dough contains from about 1.0% to about 3% of said emulsifier.

6. The process of claim 5 wherein the dough comprises at least about 25% to 30% of said added water.

7. The process of claim 6 wherein the dough comprises from about 55% to about 65% of said flour.

8. The process of claim 5 wherein the polyglycerol ester emulsifier has a saponification value of between 95 and 135.

9. A process according to claim 8 wherein the polyglycerol ester has a hydroxyl value of from about 400 to about 575.

10. The process of claim 1 wherein said non-digestible fat comprises a polyol polyester.

11. The process of claim 10 wherein the step of cutting snack pieces from the sheet comprises the step of cutting said dough into oval shaped dough pieces; and the step of frying said snack pieces comprises the step of constraining the oval shaped dough pieces during frying.

12. A process according to claim 1 comprising the additional step of spraying from about 1% to about 20% oil on the fried snack pieces wherein said oil has an iodine value of at least 75.

13. A process according to claim 1 wherein the step of forming the dough into a sheet comprises milling the dough between mill rolls which are heated to a temperature of from about 90° F. to about 135° F.

14. A process according to claim 1 wherein the polyol fatty acid polyester in the dough comprises a sucrose fatty acid polyester having at least four fatty acid ester groups.

15. The snack pieces made by the process of claim 1.

16. Fried snack pieces having, by weight, from about 0.5% to about 4% water and from about 20% to about 38% nondigestible fat, made from dough consisting essentially of, by weight:
   (1) from about 50% to about 70% of a source of starch based flour;
   (2) at least about 3% hydrolyzed starches having a DE of from about 5 to about 30;
   (3) from about 0.5% to about 6% of a fatty acid polyglycerol ester emulsifier having a saponification value of between about 80 and about 135 and a hydroxyl value of between about 300 and about 575, and wherein said fatty acid polyglycerol ester has fatty acid chains comprising palmitic acid and stearic acid, wherein the ratio of palmitic acid to stearic acid is from about 2:1 to about 5: 1, and further wherein the polyglycerol ester is at least 40% monoester;
   (4) from about 20% to about 40% added water; and
   (5) from about 1% to about 4% polyol fatty acid polyester having at least four fatty acid ester groups.

17. The snack pieces of claim 16 wherein said dough comprises from about 1% to about 3% of said emulsifier.

18. The snack pieces of claim 17, wherein said emulsifier has a saponification value of between 95 to about 135.

19. The snack pieces of claim 18 wherein said snack has a non digestible fat content of from about 23% to about 32%.

20. A dough comprising, by weight:
   (1) from about 50% to about 70% of a source of starch based flour;
   (2) from about 3% to about 15% hydrolyzed starches having a DE of from about 10 to about 20;
   (3) from about 1% to about 3% of a fatty acid polyglycerol ester having fatty acids comprising palmitic acid and stearic acid;
   (4) from about 23% to about 35% added water; and
   (5) from about 1% to about 6% polyol fatty acid polyester having at least four fatty acid ester groups;
   wherein said polyglycerol ester has a saponification value of from about 95 to about 135, a hydroxyl value of from about 400 to about 475, a complete melt point of between about 121° F. and about 147° F., and a ratio of palmitic to stearic acid from about 2:1 to about 5: 1, and is at least 40% monoester.

* * * * *

UNITED STATES PATENT AND TRADEMARK OFFICE
CERTIFICATE OF CORRECTION

PATENT NO. : 5,925,396

DATED : July 20, 1999

INVENTOR(S) : Jada Dawn Reed et al.

Page 1 of 2

It is certified that error appears in the above-identified patent and that said Letters Patent is hereby corrected as shown below:

On the title page, line 14 of the ABSTRACT, "water," should read -- water; --.

Column 1, lines 12-13, "maltodextrizin" should read -- maltodextrin --.

Column 1, line 47, "et at," should read -- et al, --.

Column 1, line 48, "caloric" should read -- calorie --.

Column 2, line 26, "sheet," should read -- sheet; --.

Column 2, line 29, "Tie" should read -- The --.

Column 3, line 35, "(I.E.)" should read -- (D.E.) --.

Column 3, line 36, "MO050," should read -- M050, --.

Column 7, line 17, "Fulcher," should read -- Fulcher; --.

Column 7, line 18, "alphabranched" should read -- alpha-branched --.

Column 8, line 53, "palinitic" should read -- palmitic --.

Column 9, line 10, "weight;" should read -- weight: --.

Column 9, line 13, "starches" should read -- starch --.

Column 10, line 19, "starches" should read -- starch --.

Column 10, line 24, delete "and", second occurrence.

UNITED STATES PATENT AND TRADEMARK OFFICE
CERTIFICATE OF CORRECTION

PATENT NO. : 5,925,396

DATED : July 20, 1999

INVENTOR(S) : Jada Dawn Reed et al.

It is certified that error appears in the above-identified patent and that said Letters Patent is hereby corrected as shown below:

Column 10, line 28, delete "further".

Column 10, line 43, "starches" should read -- starch --.

Signed and Sealed this

Twentieth Day of March, 2001

*Attest:*

NICHOLAS P. GODICI

*Attesting Officer*   *Acting Director of the United States Patent and Trademark Office*